(12) United States Patent
Ramu

(10) Patent No.: US 8,981,705 B2
(45) Date of Patent: Mar. 17, 2015

(54) PM BRUSHLESS MOTOR DRIVE CIRCUIT TOPOLOGY AND CONTROL

(75) Inventor: Krishnan Ramu, Blacksburg, VA (US)

(73) Assignee: Regal Beloit America, Inc., Beloit, WI (US)

( * ) Notice: Subject to any disclaimer, the term of this patent is extended or adjusted under 35 U.S.C. 154(b) by 861 days.

(21) Appl. No.: 13/074,513

(22) Filed: Mar. 29, 2011

(65) Prior Publication Data

US 2011/0234134 A1 Sep. 29, 2011

Related U.S. Application Data

(60) Provisional application No. 61/318,506, filed on Mar. 29, 2010.

(51) Int. Cl.
| | | |
|---|---|---|
| *H02P 1/26* | (2006.01) | |
| *H02K 1/14* | (2006.01) | |
| *H02K 3/18* | (2006.01) | |

(52) U.S. Cl.
CPC .. *H02K 1/14* (2013.01); *H02K 3/18* (2013.01); *H02K 2213/03* (2013.01)
USPC . 318/795; 318/817; 318/400.27; 318/400.17; 318/400.26

(58) Field of Classification Search
USPC ......... 318/161, 254, 439, 138, 434, 802, 800, 318/801, 471, 150, 140, 793, 824, 462, 510, 318/751, 795, 817, 400.27, 701, 400.3, 318/400.13, 400.29, 438, 778, 2, 68, 318/400.01; 322/4; 307/68, 108, 109, 120; 363/46, 62, 124, 163; 310/165, 162, 310/180, 166
See application file for complete search history.

(56) References Cited

U.S. PATENT DOCUMENTS

| | | | | |
|---|---|---|---|---|
| 4,408,268 | A  * | 10/1983 | Peters et al. ..................... | 363/62 |
| 5,661,390 | A  * | 8/1997 | Lipo et al. ..................... | 318/803 |
| 6,078,122 | A  * | 6/2000 | Tang et al. ..................... | 310/165 |
| 6,121,749 | A  * | 9/2000 | Wills et al. ..................... | 318/811 |
| 6,184,593 | B1 * | 2/2001 | Jungreis .......................... | 307/64 |
| 6,246,207 | B1 * | 6/2001 | VanSistine et al. ........... | 318/801 |
| 6,486,627 | B1 * | 11/2002 | Gabrys .......................... | 318/161 |
| 6,522,098 | B1 * | 2/2003 | Majumdar et al. ............ | 318/801 |
| 6,639,370 | B1 * | 10/2003 | Gabrys .......................... | 318/161 |
| 2005/0057210 | A1* | 3/2005 | Ueda et al. .................... | 318/801 |
| 2010/0071971 | A1* | 3/2010 | Tatematsu et al. ........... | 180/65.8 |
| 2011/0234134 | A1* | 9/2011 | Ramu ...................... | 318/400.27 |

OTHER PUBLICATIONS

R. Krishnan, "Electric Motor Drives," Prentice Hall, pp. 523, 524, 2001.
R. Krishnan, "Permanent Magnet Synchronous and Brushless DC Motor Drives," CRC Press, pp. 48-51, 155-168, and 455-472, 2009.
International Search Report and Written Opinion of the International Searching Authority dated May 25, 2011.

* cited by examiner

*Primary Examiner* — Kawing Chan
*Assistant Examiner* — Jorge L Carrasquillo
(74) *Attorney, Agent, or Firm* — Armstrong Teasdale LLP

(57) ABSTRACT

An inverter for a permanent magnet brushless dc machine, having a permanent magnet rotor and a set of stator windings, applies the full dc voltage provided to the inverter to each phase of the machine.

11 Claims, 8 Drawing Sheets

PM BRUSHLESS MOTOR DRIVE CIRCUIT TOPOLOGY AND CONTROL

This application claims priority to U.S. provisional application 61/318,506 filed Mar. 29, 2010, the content of which is incorporated herein by reference.

FIELD OF THE INVENTION

The invention relates to an inverter controlled permanent magnet brushless direct current (PMBDC) motor drive system. More specifically, the invention relates to the realization of a new inverter and its control in conjunction with a PMBDC machine to improve the operation of the entire motor drive system.

BACKGROUND OF THE RELATED ART

Permanent magnet brushless direct current (PMBDC) machines are well known in literature. Consider a three phase machine having three phase windings and a rotor with permanent magnets. The phase windings are balanced, in that they have the same number of turns per phase winding, and they are spatially phase shifted by 120 electrical degrees. The theory and operation of such machines are described in chapters 1 and 9 of the book, R. Krishnan, "Permanent Magnet Synchronous and Brushless DC Motor Drives", CRC Press, 2009. The theory and operation of a three phase H-bridge inverter is common knowledge and described in the same book in chapters 2 and 10.

Consider the magnitude of a direct current (dc) input voltage to an inverter as $V_{s1}$, which can be supplied from either a battery source or a rectified alternating current (ac) source. Assuming two phase windings of a machine are series connected, the instantaneous maximum voltage that is applied across a machine winding phase through a three phase inverter is $0.5 V_{s1}$. If the current in a phase is 1, then the input power per phase is $0.5 V_{s1} I$. Since two phases conduct at any given time in a PMBDC motor drive, the maximum input power to the PMBDC machine is $2*0.5 V_{s1} I = V_{s1} I$.

Because the two windings are in series, they carry the same current I. From the dc link or input side, the instantaneous power supplied to the inverter and machine is the product of voltage $V_{s1}$ and current I, expressed as $V_{s1} I$. The instantaneous power is equal to the inverter input power and the machine input power, if losses in the inverter are ignored.

The inverter supplies each phase with 120 electrical-degrees-wide current in both positive and negative cycles; that is, the inverter supplies a bipolar or alternating current to the machine phase windings. Furthermore, an inverter phase leg has an ideal duty cycle of ⅔, meaning that it is active for that part of the time in the machine's ac cycle. For the remaining ⅓ of the cycle time, the inverter is in the off condition (i.e., it is not active). This is true for all three phases in the inverter.

The machine phase windings carry the alternating currents generated through the inverter, though the current of each winding is phase shifted from the others by 120 electrical degrees. The phase shift of the current in each winding is the same amount as the spatial phase shift between the winding phases, so as to produce a uniform and constant air gap torque and power.

Consider the winding resistive losses in the PMBDC machine and let the resistance per phase be $R_s$ in units of Ohms. The total instantaneous winding power loss is equal to $I^2 R_s$ per phase. Since two winding phases conduct in a PMBDC machine at any given time, the total resistive loss is $2 I^2 R_s$.

SUMMARY OF THE INVENTION

Because the resistive loss of a permanent magnet brushless direct current (PMBDC) machine is $2 I^2 R_s$, the voltage applied to a phase may be increased without affecting the resistive loss. As the voltage applied to a phase is increased, the phase current may be correspondingly decreased without affecting the input power to the machine. However, the resistive loss decreases as the phase current decreases, resulting in higher operational efficiency of the motor. An improved inverter, for driving a PMBDC machine, that applies higher voltage and lower current to a phase, so as to reduce resistive loss, is an object of this invention.

Other objects of the invention include increasing the applied voltage across a machine phase to greater than half a direct current (dc) input voltage, decreasing conductive losses in inverter transistors, decreasing combined power losses, achieving high efficiency of a motor drive system, achieving higher speed of operation for constant torque operation, achieving alternating current and voltage control with higher phase voltages in the machine, achieving four quadrant operation, and increasing reliability and fault tolerance for the drive system. A control system to coordinate the operation of the motor drive system is a further objective of the invention. To achieve these objects, the inverter disclosed hereinafter produces an input voltage that is greater than or comparable to that of a dc input supply voltage.

These and other objects of the invention may be achieved by a motor drive system having: (1) a first capacitive element that stores energy so as to provide a first dc voltage supply and (2) a second capacitive element that stores energy so as to provide a second dc voltage supply. A first electrically conductive switch electrically connects in series with a winding of a single motor phase and the first capacitive element to form a first series circuit when the first switch conducts current. A second electrically conductive switch electrically connects in series with the motor phase winding and the second capacitive element to form a second series circuit when the second switch conducts current. The entire voltage of the first capacitive element is applied across the motor phase winding, less the voltage drop across the first switch and the voltage drop resulting from parasitic resistance in the first series circuit, when: (1) the second switch does not conduct current and (2) the second capacitive element is neither being charged nor discharged. The entire voltage of the second capacitive element is applied across the motor phase winding, less the voltage drop across the second switch and the voltage drop resulting from parasitic resistance in the second series circuit, when: (1) the first switch does not conduct current and (2) the first capacitive element is neither being charged nor discharged.

Moreover, the above-mentioned and other objects of the invention may be achieved by a motor drive system having: (1) a phase winding of a motor that applies electromotive force to a rotor of the motor; (2) a first capacitive element that stores energy so as to provide a first dc voltage supply; and (3) a second capacitive element that stores energy so as to provide a second dc voltage supply. A first electrically conductive switch electrically connects in series with the motor phase winding and the first capacitive element to form a first series circuit when the first switch conducts current. A second electrically conductive switch electrically connects in series with the motor phase winding and the second capacitive element to form a second series circuit when the second switch conducts current. The entire voltage of the first capacitive element is applied across the motor phase winding, less the Voltage drop across the first switch and the voltage drop resulting from parasitic resistance in the first series circuit, when: (1) the second switch does not conduct current and (2) the second capacitive element is neither being charged nor discharged. The entire voltage of the second capacitive element is applied across the motor phase winding, less the voltage drop across the second switch and the voltage drop resulting from parasitic resistance in the second series circuit, when: (1) the first switch does not conduct current and (2) the first capacitive element is neither being charged nor discharged.

Furthermore, the above-mentioned and other objects of the invention may be achieved by a motor drive system having a first capacitive element that stores energy so as to provide a first dc voltage supply, a second capacitive element that stores energy so as to provide a second dc voltage supply, and first, second, third, and fourth electrically conductive switches each having an input current terminal and an output current terminal. A first terminal of the first capacitive element is electrically connected directly to the input current terminals of the first and second switches. A second terminal of the first capacitive element is electrically connected directly to a first terminal of the second capacitive element. A second terminal of the second capacitive element is electrically connected directly to the output current terminals of the third and fourth switches. The output current terminal of the first switch is electrically connected directly to the input current terminal of the third switch. The output current terminal of the second switch is electrically connected directly to the input current terminal of the fourth switch. A first terminal of a winding of a first motor phase is electrically connected directly to the second terminal of the first capacitive element and the first terminal of the second capacitive element. A second terminal of the first motor phase winding is electrically connected directly to the output current terminal of the first switch and the input current terminal of the third switch. A first terminal of a winding of a second motor phase is electrically connected directly to the second terminal of the first capacitive element and the first terminal of the second capacitive element. A second terminal of the second motor phase winding is electrically connected directly to the output current terminal of the second switch and the input current terminal of the fourth switch.

Still further, the above-mentioned and other objects of the invention may be achieved by a motor drive method that discharges energy stored by a first capacitive element into a single electrical phase of a motor, via a first electrically conductive switch, such that the entire voltage across the first capacitive element is applied across the motor phase winding, less the voltage drop across the first switch and the voltage drop resulting from parasitic resistance in a first series circuit comprising the first capacitive element, the first switch, and the motor phase winding. Additionally, the energy stored by the motor phase winding is discharged into a second capacitive element, via a second electrically conductive switch, such that the entire voltage across the motor phase winding is applied across the second capacitive element, less the voltage drop across the second switch and the voltage drop resulting from parasitic resistance in a second series circuit comprising the second capacitive element, the second switch, and the motor phase winding.

In accordance with the exemplary embodiment of the invention, a PMBDC machine drive system has a machine with permanent magnet (PM) rotor and a stator with three phase windings. The three phase stator windings are spatially shifted from each other by 120 electrical degrees and have a neutral connection amongst them. The induced electromotive forces (emfs) across machine phases are, ideally, trapezoidal waveforms with a constant region over 120 electrical degrees in both half cycles; a deviation from such ideality has no impact on the invention and objectives.

The PMBDC system has an H-bridge inverter to supply currents to the stator phase windings. The inverter's input dc voltage positive polarity is connected to the top rail of the inverter, and the input voltage's negative polarity is connected to the neutral of the machine stator phase windings. A dc link capacitor $C_1$ is connected between the positive and negative polarities of the input dc voltage. An additional dc capacitor $C_2$ is connected between the neutral and bottom rail of the three phase inverter subsystem.

A supply dc input voltage $V_{s1}$, operating in conjunction with the machine windings and diodes in the bottom half of the inverter bridge, charges capacitor $C_2$, thereby generating a voltage across it. The charging of capacitor $C_2$ happens whenever conducting transistors in the top half of the inverter bridge are turned off and the current in the machine phase operates to forward bias the diodes in the bottom inverter half. The terminal of capacitor $C_2$ tied to the neutral side of the machine side is charged to a positive polarity and the terminal of capacitor $C_2$ tied to the bottom rail side of the inverter is charged to negative polarity.

With this arrangement, the machine phase windings have available, on their positive cycle operation, a voltage equal to the dc input supply voltage $V_{s1}$, through the control of the transistors in the top half of the inverter bridge. On the negative cycle operation of the machine, phase windings are supplied a voltage equal to the voltage available across $C_2$, i.e., $V_{s2}$, through the operation of transistors in the bottom half of the inverter bridge.

When the conducting top transistor of a phase leg is turned off, the current in the phase corresponding to this transistor is taken over by the diode in the bottom of the phase leg, completing the current path via capacitor $C_2$. Likewise, when the conducting bottom transistor of a phase leg is turned off, the current in the phase winding is routed through the top diode of the phase leg, completing the current path via capacitor $C_1$ and charging it. This operation partially transfers the energy from the machine phase winding to a capacitor, and part of the energy is converted to power input for the machine. The voltages across capacitors $C_1$ and $C_2$ may be the same or different.

The drive system may use a standard H bridge inverter and a neutral connection of a three-phase machine, so as not to add additional cost beyond that of a conventional system. However, the drive system requires an additional capacitor $C_2$ and higher voltage ratings for transistors and diodes in the inverter, which do add an incremental cost to the total PMBDC motor drive system.

The drive system inverter and PMBDC motor disclosed herein reduce the conduction losses in the inverter transistors and diodes. The lower losses in the inverter cause lower total losses, resulting in higher efficiency. Further, the drive system provides higher peak power operation and higher speeds of operation at full load torque.

DETAILED DESCRIPTION OF THE INVENTION

Figure 1:
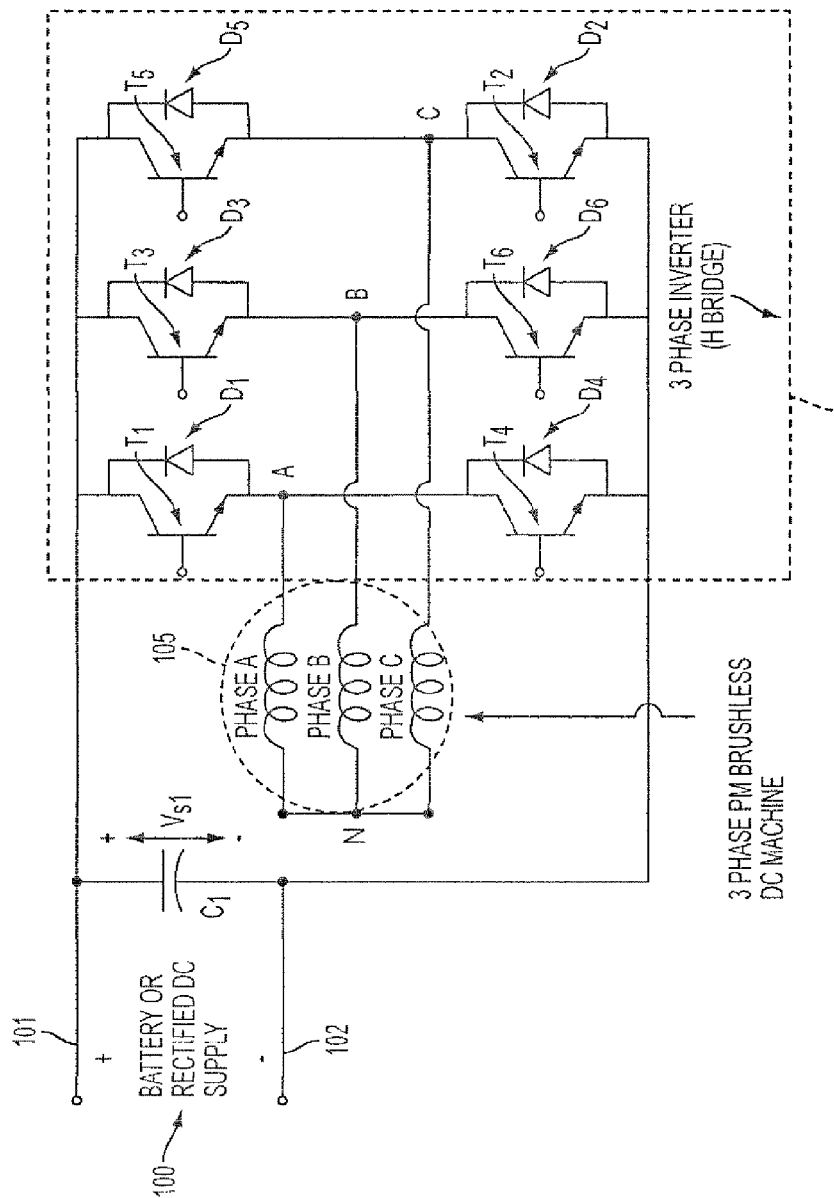
FIG. 1 illustrates a related art inverter permanent magnet brushless direct current (PMBDC) motor drive system.

FIG. 1 illustrates an inverter permanent magnet brushless direct current (PMBDC) motor drive system of the related art. A direct current (dc) supply voltage 100, obtained either from a rectifier connected to the utility supply or from a battery, is provided to an inverter 110. A filtering capacitor $C_1$ is connected in parallel with dc supply voltage 100, via a upper voltage rail 101 and a lower voltage rail 102, to smooth the voltage variations of dc supply voltage 100. The dc voltage existing across capacitor $C_1$ and provided to inverter 110 is expressed as $V_{s1}$.

Inverter 110 is a three-phase H bridge inverter and is electrically connected in parallel with capacitor $C_1$ via voltage rails 101 and 102. Inverter 110 has two transistors in each of three phase legs. Phase leg A includes transistors $T_1$ and $T_4$ electrically connected in series. A diode $D_1$ is connected in parallel with transistor $T_1$, such that the cathode of diode $D_1$ is electrically connected to transistor $T_1$'s collector and the anode of diode $D_1$ is electrically connected to the emitter of transistor $T_1$. A diode $D_4$ is similarly connected in parallel with transistor $T_4$. Phase leg B includes transistors $T_3$ and $T_6$ electrically connected in series, and phase leg C includes transistors $T_5$ and $T_2$ electrically connected in series. Each of transistors $T_2$, $T_3$, $T_5$, and $T_6$ has a corresponding diode $D_2$, $D_3$, $D_5$, and $D_6$ electrically connected in parallel with the respective transistor, in the same way that diode $D_1$ is connected to transistor $T_1$.

The current conduction in each of transistors $T_1$-$T_6$ and diodes $D_1$-$D_6$ is indicated by an arrow in FIG. 1. Each of transistors $T_1$-$T_6$ conducts current from collector to emitter, and each of diodes $D_1$-$D_6$ conducts current from anode to cathode.

The collectors of transistors $T_1$, $T_3$, and $T_5$ and cathodes of diodes $D_1$, $D_3$, and $D_5$ are electrically connected to upper voltage rail 101. The emitters of transistors $T_2$, $T_4$, and $T_6$ and anodes of diodes $D_2$, $D_4$, and $D_6$ are electrically connected to lower voltage rail 102. The gates of transistors $T_1$-$T_6$ are individually controlled to govern the flow of current through the respective transistor.

A PMBDC motor 105 has three phase stator windings with phases A, B, and C, Phase leg A controls the current flow through the windings of phase A, phase leg B controls the current flow through the windings of phase B, and phase leg C controls the current flow through the windings of phase C. One end of the stator winding for phase A is electrically connected to neutral N and the other end is electrically connected to the emitter of transistor $T_1$, the collector of transistor $T_4$, the anode of diode $D_1$, and the cathode of diode $D_4$. Similarly, one end of the stator winding for phase B is electrically connected to neutral N and the other end is electrically connected to the emitter of transistor $T_3$, the collector of transistor $T_6$, the anode of diode $D_3$, and the cathode of diode $D_6$. And similarly, one end of the stator winding for phase C is electrically connected to neutral N and the other end is electrically connected to the emitter of transistor $T_5$, the collector of transistor $T_2$, the anode of diode $D_5$, and the cathode of diode $D_2$.

The theory and operation of the PMBDC machine illustrated in FIG. 1 are described in chapters 1 and 9 of the book, R. Krishnan, "Permanent Magnet Synchronous and Brushless DC Motor Drives", CRC Press, 2009. The theory and operation of the three phase H-bridge inverter illustrated in FIG. 1 are described in the same book, in chapters 2 and 10.

Figure 2:
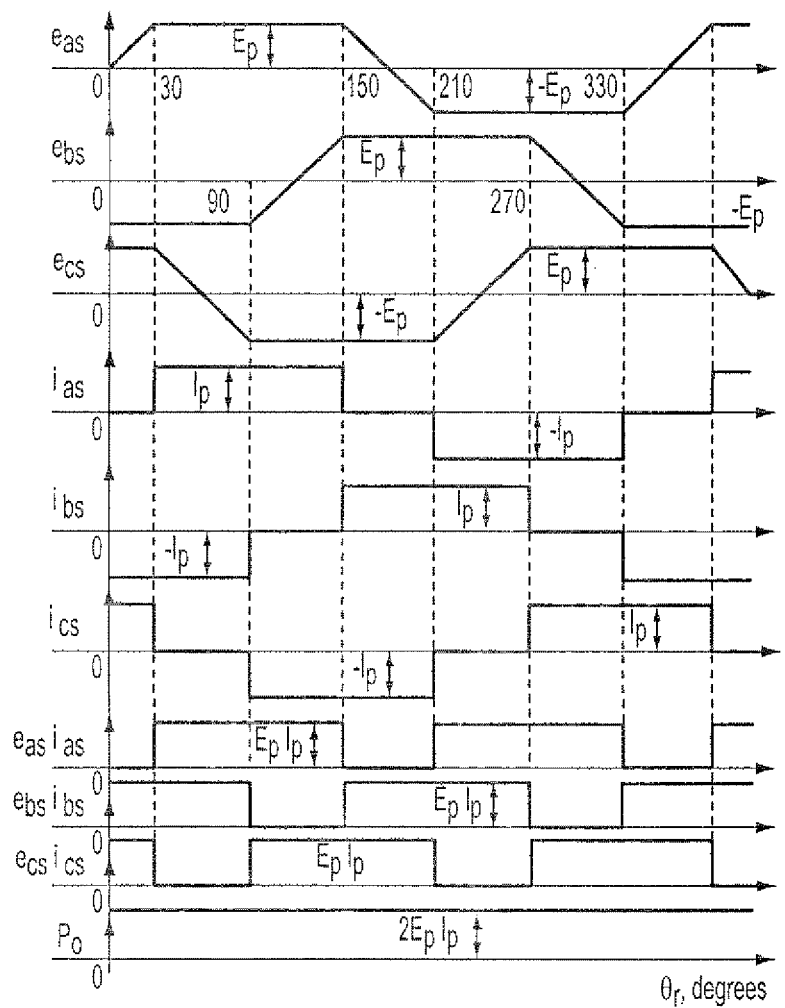
FIG. 2 illustrates the operation of the PMBDC motor drive system of FIG. 1.

FIG. 2 illustrates the operation of the PMBDC motor drive system of FIG. 1. The induced electromotive forces (emfs) of phases A, B, and C are denoted as $e_{as}$, $e_{bs}$ and $e_{cs}$, respectively. The induced emf of a phase is the instantaneous voltage induced across its corresponding phase winding. Each of phases A-C of the PMBDC machine has a trapezoidal, induced emf with a constant voltage magnitude of $E_p$, both in the phase's positive and negative 120° cycles, for some period of a 360° cycle and a ramp voltage rising from $-E_p$ to $+E_p$ or falling from $+E_p$ to $-E_p$ during the remaining period of the 120° cycle. The induced emfs of each of phases A-C are electrically phase shifted from each other by 120°. The induced emf magnitude $E_p$ is expressed as:

$$E_p(Blv)N=N(Blr\omega_m)=N\phi_a\omega_m=\lambda_p\omega_m \quad (1)$$

where N is the number of conductors in series per phase, v is the velocity, l is the length of the conductor, r is the radius of the rotor bore, $\omega_m$ is the angular velocity, and B is the flux density of the field in which the conductors are placed. This flux density is solely due to the rotor magnets. The product (Blv), also expressed as $\phi_a$, has the dimensions of flux and is directly proportional to the airgap flux $\phi_g$ expressed in equation (2):

$$\phi_a = Blr = \frac{1}{\pi}B\pi lr = \frac{1}{\pi}\phi_g \quad (2)$$

The product of flux and number of conductors in series has the dimension of flux linkage and is denoted by $\lambda_p$. Since the product of flux and number of conductors in series is proportional to phase flux linkage by a factor of $$\frac{1}{\pi},$$

the product is hereafter referred to as modified flux linkage.

The electromagnetic torque is given by:

$$T_e = [e_{as}i_{as} + e_{bs}i_{bs} + e_{cs}i_{cs}]\frac{1}{\omega_m}, \quad N \cdot m \quad (3)$$

The instantaneous induced emfs, having units of volts, may be expressed as:

$$e_{as}=f_{as}(\theta_r)\lambda_p\omega_m \quad (4)$$

$$e_{bs}=f_{bs}(\theta_r)\lambda_p\omega_m \quad (5)$$

$$e_{cs}=f_{cs}(\theta_r)\lambda_p\omega_m \quad (6)$$

where the functions $f_{as}(\theta_r)$, $f_{bs}(\theta_r)$ and $f_{cs}(\theta_r)$ have the same shape as $e_{as}$, $e_{bs}$ and $e_{cs}$, with a maximum magnitude of ±1.

The electromagnetic torque, having units of N·m, may be expressed, after substituting for induced emfs from equations (4, 5 and 6) into equation (3), as:

$$T_e = \lambda_p [f_{as}(\theta_r) i_{as} + f_{bs}(\theta_r) i_{bs} + f_{cs}(\theta_r) i_{cs}], N \cdot m \quad (7)$$

Currents are generated when the functions $f_{as}(\theta_r)$, $f_{bs}(\theta_r)$ and $f_{cs}(\theta_r)$ attain a value of ±1 in PMBDC motor drives. Only two of the three phases are excited, with current going into one (with positive function value of 1, say for phase A) and the current coming out of the other one of the excited phases (with the negative function value of −1, say for phase B), such that the electromagnetic torque becomes:

$$T_e = \lambda_p [i_{as} + (-1) i_{bs}], N \cdot m. \quad (8)$$

For an example in which phases A and B are excited, if the current in phase A is positive, then the current in phase B is negative. The currents in phases A and B are equal in magnitude because they are produced by turning on transistors $T_1$ and $T_6$, and the activation of transistors $T_1$ and $T_6$ causes phase A winding and phase B winding to be connected in series against dc supply voltage 100. Denoting the current in both phases as $I_p$, the torque equation may be expressed as:

$$T_e = 2\lambda_p I_p, N \cdot m. \quad (9)$$

The air gap power acquired from summing the products of the induced emfs of the phases, with their respective currents, at any time is expressed by the equation:

$$P_o = [e_{as} i_{as} + e_{bs} i_{bs} + e_{cs} i_{cs}] = E_p I_p + (-E_p)(-I_p) = 2 E_p I_p \quad (10)$$

FIG. 2 illustrates the phase-induced emfs, respective phase currents, respective air gap power for each phase, and total air gap power for the machine as a function of electrical rotor position.

Figure 4:
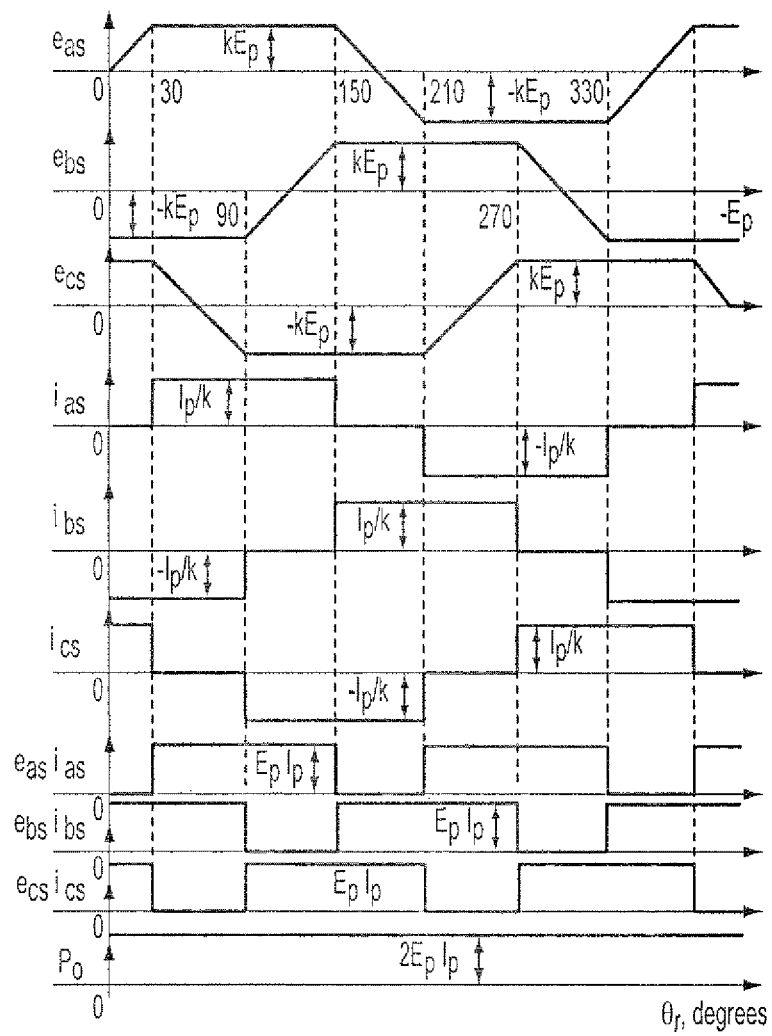
FIG. 4 illustrates the operation of the PMBDC motor drive system of FIG. 3.

Suppose the related art is maintained the same, as shown in FIG. 2, except that the induced emf is increased by a factor of k for all phases and the applied currents from the inverter is reduced by a factor of 1/k for all phase currents. The induced emfs are increased by increasing the number of turns in the phases. The operation with such scaling is illustrated in FIG. 4, which is very similar to FIG. 2, and all the variables and their symbols mean the same things in both figures. The consequence of such an operation yields the torque and air gap power as:

$$P_o = k E_p \frac{I_p}{k} + (-k E_p)\left(-\frac{I_p}{k}\right) = 2 E_p I_p \quad (11)$$

$$T_e = 2\lambda_p I_p, \quad N \cdot m. \quad (12)$$

Nothing has changed in the air gap power or in the electromagnetic torque by increasing the induced emf and decreasing by the same proportion the applied currents to the machine phases between the scaled approach and the related art system. The induced emf for the scaled approach may be increased to match that the supply voltage, and the phase currents can be decreased by the same proportion to which the induced emfs are increased.

Usually the alternating current (ac) or dc supply voltage is a fixed value and not subject to change in practical applications. However, the dc supply voltage to the inverter may be increased by boosting the rectified ac voltage or battery voltage by a boost converter placed between the dc supply and the inverter. This modification introduces an additional power converter, which decreases system efficiency and increases the number of power electronic components and system cost.

Thus, it would be desirable to make the same battery voltage or rectified ac output voltage available to one phase instead of two phases in series, such that the available voltage to the machine phase becomes doubled compared to the related art system of FIG. 1. In the system of FIG. 1, two phase windings are in series and their currents are equal but the applied voltage to each phase winding from the dc supply voltage is half the dc supply voltage. The subject matter disclosed herein provides a unique way of applying the entire dc supply voltage to each phase of the machine, without an additional power converter, such as a boost converter.

Figure 3:
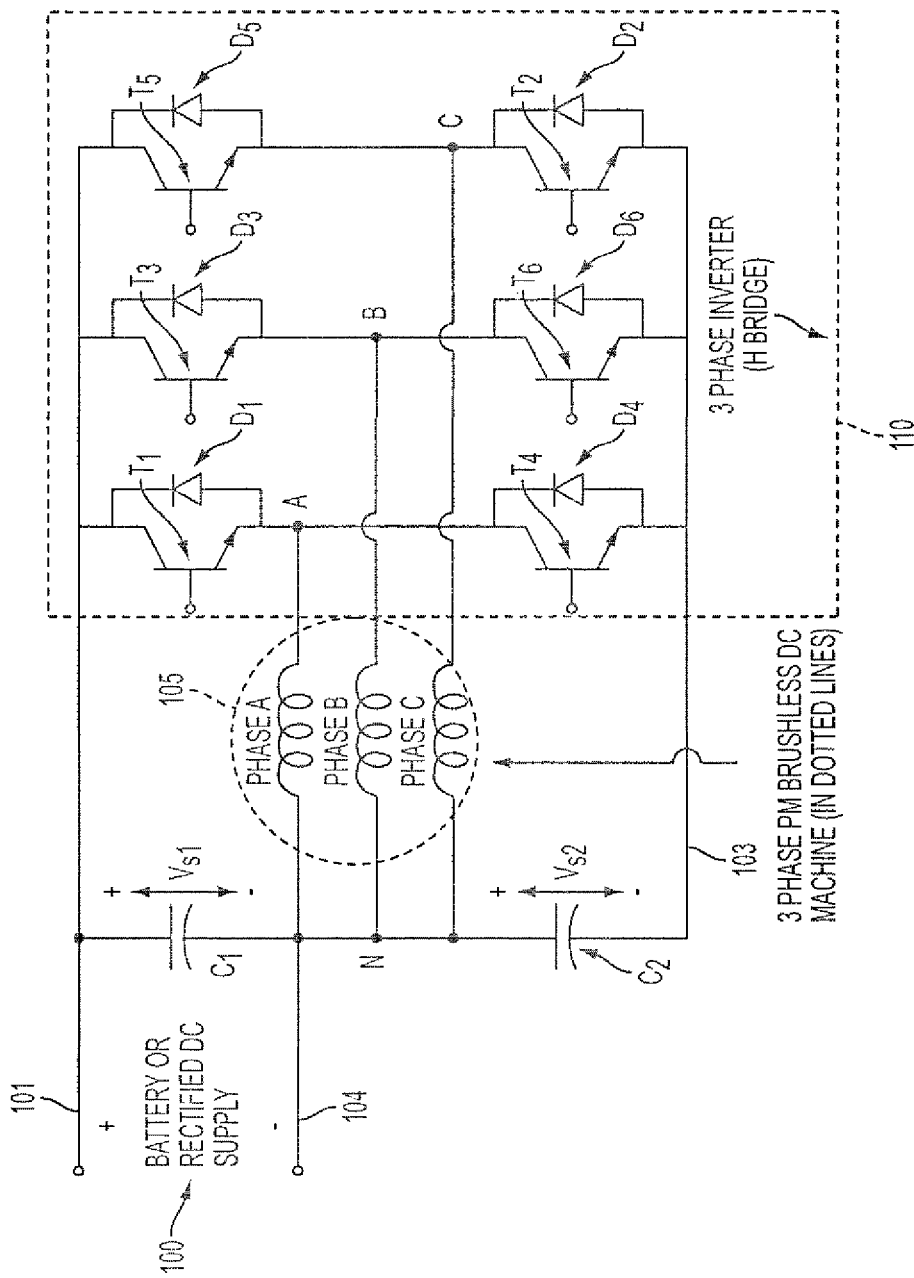
FIG. 3 illustrates an inverter PMBDC motor drive system.

FIG. 3 illustrates an inverter controlled PMBDC motor drive system. Components of the drive system illustrated in FIG. 3 that are common to those of the drive system of FIG. 1 are identified with the same reference characters in each drawing.

A dc supply voltage 100, obtained either from a rectifier that is connected to a utility supply or from a battery, is provided to an inverter 110. A filtering capacitor $C_1$ is connected in parallel with dc supply voltage 100, via an upper voltage rail 101 and an intermediate voltage rail 104, to smooth the voltage variations of dc supply voltage 100. A capacitor C2 is electrically connected between intermediate voltage rail 104 and a lower voltage rail 103. The dc voltage existing across capacitor $C_1$ is expressed as $V_{s1}$, and that existing across capacitor $C_2$ is expressed as $V_{s2}$. Ideally, $V_{s1}$ is the same voltage as supply dc voltage 100.

Inverter 110 is a three-phase H bridge inverter and is electrically connected in parallel with the series connection of capacitors $C_1$ and $C_2$, via voltage rails 101 and 103. Inverter 110 has two transistors in each of three phase legs. Phase leg A includes transistors $T_1$ and $T_4$ that are electrically connected in series. A diode $D_1$ is connected in parallel with transistor $T_1$, such that the cathode of diode $D_1$ is electrically connected to transistor $T_1$'s collector and the anode of diode $D_1$ is electrically connected to the emitter of transistor $T_1$. A diode $D_4$ is similarly connected in parallel with transistor $T_4$. Phase leg B includes transistors $T_3$ and $T_6$ that are electrically connected in series, and phase leg C includes transistors $T_5$ and $T_2$ that are electrically connected in series. Each of transistors $T_2$, $T_3$, $T_5$, and $T_6$ has a corresponding diode $D_2$, $D_3$, $D_5$, and $D_6$ electrically connected in parallel with the respective transistor, in the same way that diode $D_1$ is connected to transistor $T_1$.

The current conduction in each of transistors $T_1$-$T_6$ and diodes $D_1$-$D_6$ is indicated by an arrow in FIG. 1. Each of transistors $T_1$-$T_6$ conducts current from collector to emitter, and each of diodes $D_1$-$D_6$ conducts current from anode to cathode.

The collectors of transistors $T_1$, $T_3$, and $T_5$ and cathodes of diodes $D_1$, $D_3$, and $D_5$ are electrically connected to upper voltage rail 101. The emitters of transistors $T_2$, $T_4$, and $T_6$ and anodes of diodes $D_2$, $D_4$, and $D_6$ are electrically connected to lower voltage rail 103. The gates of transistors $T_1$-$T_6$ are individually controlled to govern the flow of current through the respective transistor.

A PMBDC motor 105 has three phase stator windings with phases A, B, and C. Phase leg A controls the current flow through the windings of phase A, phase leg B controls the current flow through the windings of phase B, and phase leg C controls the current flow through the windings of phase C. One end of the stator winding for phase A is electrically connected to neutral N and the other end is electrically connected to the emitter of transistor $T_1$, the collector of transistor $T_4$, the anode of diode $D_1$, and the cathode of diode $D_4$. Similarly, one end of the stator winding for phase B is electrically connected to neutral N and the other end is electrically connected to the emitter of transistor $T_3$, the collector of transistor $T_6$, the anode of diode $D_3$, and the cathode of diode $D_6$. And similarly, one end of the stator winding for phase C is electrically connected to neutral N and the other end is electrically connected to the emitter of transistor $T_5$, the collector of transistor $T_2$, the anode of diode $D_5$, and the cathode of diode $D_2$. Neutral N is electrically connected to intermediate voltage rail 104.

Consider the operation of phase A as characteristic of that for each of phases A-C. Turning on transistor $T_1$ applies voltage $V_{s1}$ to phase A winding, causing a positive current to flow from upper voltage rail 101 through transistor T1 and phase winding A to intermediate voltage rail 104. If the induced electromotive force (emf) across phase winding A is positive, positive power is supplied to phase winding A, resulting in positive torque and positive speed (CW). As positive power is applied to phase winding A, energy is transferred from dc supply voltage 100 to motor 105. Motor 105's forward motoring operation is defined by a first quadrant I of the torque versus speed characteristics illustrated in FIG. 5.

Figure 5:
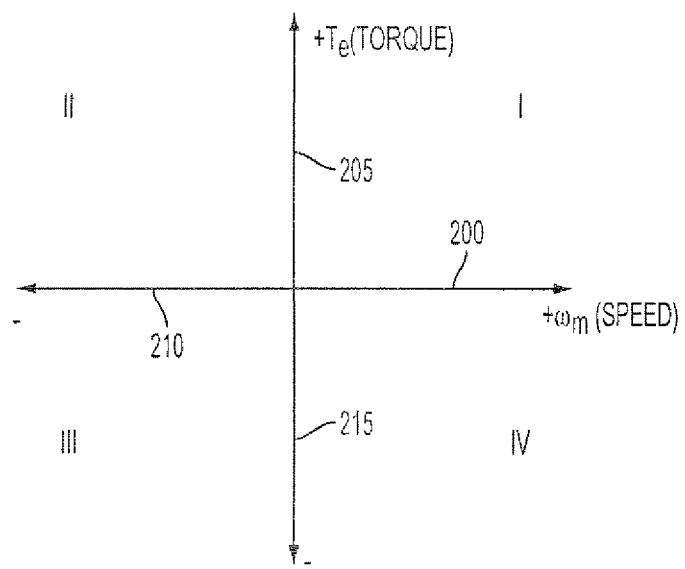
FIG. 5 illustrates the four quadrants of torque vs. speed and the operational domain available to the PMBDC motor drive system of FIG. 3.

The four quadrant operation of the PMBDC motor drive is shown in FIG. 5. The x axis of the illustrated coordinate system denotes rotor speed, and the y axis denotes the applied torque. Particularly, positive x axis 200 corresponds to positive, forward, or clockwise rotation in speed while the negative x axis 210 corresponds to negative, reverse, or counter-clockwise rotation in speed. Positive torque corresponds to positive y axis 205, and negative torque corresponds to negative y axis 215.

When transistor $T_1$ is turned off to control the current in phase A, energy stored by phase winding A is conveyed by diode $D_4$ to capacitor C2, which is charged to a voltage of $V_{s2}$. During this time, energy is transferred from motor 105 to capacitor $C_2$. The applied voltage across phase winding A is $-V_{s2}$ at this time and the torque is positive, as the current and speed are still positive; therefore, the power output is positive. This operation also corresponds to quadrant I in FIG. 5.

Suppose the speed of motor 105 is positive and transistor $T_4$ is turned on to circulate a current from $C_2$ to phase winding A in a negative direction while the induced emf is positive (i.e., with the positive polarity of the induced emf existing at the collector of transistor $T_4$ and the negative polarity existing at neutral N). This action will build a large current in phase winding A and, in order to keep within safe current limits, transistor $T_4$ will have to be turned off. Then, the current in phase winding A will find a path through diode $D_1$ to charge capacitor $C_1$, thereby transferring energy from motor 105 to dc supply source 100. During this time, the induced emf is positive and current is negative in phase winding A, with the result that motor 105 produces a negative torque (i.e., generative torque and hence negative power). This operation corresponds to quadrant IV of FIG. 5. Hence, for positive or forward rotation of the rotor, quadrants I and IV correspond to forward motoring and forward regeneration.

Likewise quadrant I is replaced by quadrant III and quadrant IV replaced by quadrant II for reverse motoring and reverse regeneration, respectively. For brevity, those operations are not elaborated here as they can be deduced and derived from the foregoing understanding of quadrant I and IV operations using the inverter. This description of operation proves that the motor drive system of FIG. 3 provides full dc bus voltage $V_{s1}$ to each phase winding during its positive cycles. Also the description proves that the motor drive system of FIG. 3 lends itself to four quadrant operation.

In addition, the motor drive system of FIG. 3 makes possible full dc bus voltage application to the machine phases while creating an additional voltage source for higher degree of freedom in operation. This is made possible by cycling energy, from the turn off of currents in the positive half cycles of the phases, to charge capacitor $C_2$, resulting in dc voltage source $V_{s2}$. DC voltage source $V_{s2}$ is applied during the negative half cycle operation of the machine phases with the full magnitude of $V_{s2}$ being applied to the phases of motor 105. The magnitude of $V_{s2}$ is comparable to $V_{s1}$.

The voltage available for operation in quadrants I and IV is $V_{s1}$ and in quadrants of II and III is $V_{s2}$. The fact that $V_{s2}$ is derived from $V_{s1}$ through the motor drive system of FIG. 3 during the positive half-cycle turn off of the phases makes it a somewhat dependent source. Source voltage $V_{s2}$ can be controlled by the inverter operation and its application to machine phase windings increases the phase root-mean-square (rms) (or effective) voltage with the result that the torque and power harvested out of the machine is increased. The phase voltage of the motor drive system of FIG. 3 is twice that of the motor drive system of FIG. 1.

Only one dc input supply voltage, $V_{s1}$, is available for the motor drive system of FIG. 3. With that, another voltage source, $V_{s2}$, for operating motor 105 is generated using capacitor $C_2$ and the bottom diodes of inverter 110. In the process, a separate buck or boost or buck-boost circuit is not required to create the additional voltage source. Therefore, the motor drive system of FIG. 3 does not require additional devices to achieve higher phase voltages, but uses only the devices that exist in inverter 110.

Further, no additional charging of capacitor $C_2$ takes place without affecting, by controlling the magnitude of the current in the machine, the current control using pulse width modulation and resulting torque control. Two voltage sources, $V_{s1}$ and $V_{s2}$, being available to control and generate torque in PMBDC motor 105 endows many choices in the control and maximization of efficiency in motor 105. The motor drive system of FIG. 3 supports the operation of the PMBDC machine with mostly unidirectional current, using only source voltage $V_{s1}$ in the positive cycle, or partly bidirectional current control using both sources, $V_{s1}$ for positive half cycle currents and $V_{s2}$ for negative half cycle currents, as illustrated in FIG. 4.

With the drive control system of FIG. 3, the phase voltage (i.e., the voltage applied across each phase winding) is the entire supply voltage $V_{s1}$. By contrast, the motor drive system of FIG. 1 has two phase windings in series such that each phase is supplied with half the input voltage (i.e., $0.5V_{s1}$). Implications of this feature are described below.

Consider the PMBDC machine drive system of FIG. 1 in relation to that of FIG. 3. The phase current requirement for an input power of $V_{s1}I$ is calculated as follows and given in Table 1.

TABLE 1

| Terms | FIG. 1 System | FIG. 3 System |
|---|---|---|
| Current | Bidirectional | Bidirectional |
| Phase voltage | $V_{s1}/2$ | $V_{s1}$ |
| Phase current to be derived based on power $V_{s1}I$ | $\dfrac{V_{s1}I/2}{V_{s1}/2} = I$ | $\dfrac{V_{s1}I}{V_{s1}} = I \text{(unidirectional)}$ |
| | | $\dfrac{1}{2}\dfrac{V_{s1}I}{V_{s1}} = \dfrac{I}{2} \text{(bidirectional)}$ |

Figure 6:
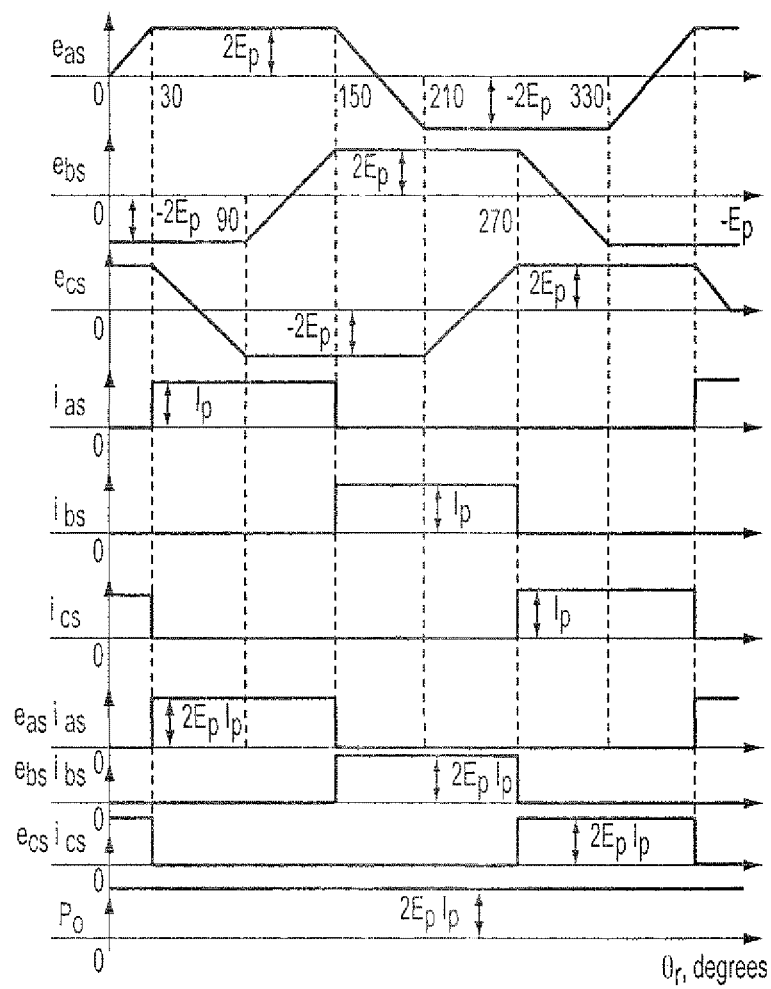
FIG. 6 illustrates the unidirectional control operation of the PMBDC motor drive system of FIG. 3.

For only unidirectional current in the machine phases of the system of FIG. 3, the current requirement is the same as for the system of FIG. 1. For the unidirectional current operation of the system illustrated in FIG. 3, which operation is illustrated in FIG. 6, only positive half-cycle currents flow in the phase windings of motor 105. The positive-cycle current operation of any phase lasts only for 120°, which is one third of the full cycle of a phase voltage or current having 360 electrical degrees. Therefore, the phase currents exist for only ⅓ of the time and have a duty cycle d of ⅓. The rms value of a constant current $I_p$ having a duty cycle d is $I/(d)^{1/2}$. Therefore, the rms current through a phase winding during a duty cycle of ⅓ $I_p/(3)^{1/2}$.

The motor drive system of FIG. 1 has phase conduction for both positive and negative half cycles for electrical 120° in each of these cycles. Therefore, the phase currents are present for electrical 240° which constitutes ⅔ of the entire phase cycle. Thus, the duty cycle of the phase currents is ⅔ and the rms current is calculated from current magnitude divided by the square root of the duty cycle, which is expressed as $I_p/(⅔)^{1/2}$.

The difference in the rms phase winding currents of the systems of FIGS. 1 and 3 are also reflected in the average phase winding currents for these two systems. Thus, the current rating of the motor drive system illustrated in FIG. 3 is lower than that for the system of FIG. 1.

The motor drive system of FIG. 1 cannot provide unidirectional current in the phase windings of motor 105. The reason for this is that the phase windings are connected in series and for a positive current to flow in one phase winding the flowing current must come from the series-connected phase winding. But the current flowing into the one phase winding is positive while the current flowing out of the other phase is negative. Because the current in one phase winding must be equal and opposite to the current in the other phase winding of the series connected phase windings, it is impossible to have unidirectional currents. Therefore, unidirectional currents cannot be applied to the phase winding of the motor drive system illustrated in FIG. 1.

As illustrated in FIG. 6, the induced emf of a phase is $2E_p$ for the system of FIG. 3, whereas the induced emf for a phase of the system illustrated by FIG. 1 is $E_p$, as illustrated in FIG. 2. Since two phase windings are in series in the system of FIG. 1, the total induced emf facing the supply input voltage is twice the induced emf per phase, which then is equal to $2E_p$. For the system illustrated in FIG. 3, the supply dc input voltage faces only one induced emf per phase at any time. Assuming the supply voltage is the same for the systems of FIGS. 1 and 3, the same dc input voltage supply should be able to support the same induced emf facing it, which is $2E_p$. Thus, the number of turns for a phase of the system illustrated by FIG. 3 may be doubled with respect to those of the system of FIG. 1, so as to achieve the same amount of induced emf facing the voltage supply. With equal currents of $I_p$ being drawn for each phase in both the systems of FIGS. 1 and 3, the air gap power is the same, as illustrated in FIGS. 2 and 6, and there is no difference in power output or torque for the two systems For bipolar current in the machine phases of the system illustrated in FIG. 3, the current in the phases is $0.5I_p$, which is 50% less than that within the system of FIG. 1. This advantage in current rating for the system of FIG. 3 is due to the doubling of the phase voltage available to the phase windings. The doubling of the available phase voltage can also be used to extend the operational speed range of a motor, as described later.

Assume that unidirectional current plays a major role in torque generation for the system of FIG. 3 and that there are no bidirectional currents. In this case, the number of winding tunes in the system of FIG. 3 has to be twice that of the system of FIG. 1 to achieve the same induced emf. Further assume that the copper volume and cost is matched in both systems.

From these assumptions, the information within Table 2 may be derived for the systems of FIGS. 1 and 3.

TABLE 2

| Categories | FIG. 1 System | FIG. 3 System |
|---|---|---|
| 1. Number of turns per phase | $N_s$ | $2N_s$ |
| 2. Wire cross-section | $a_c$ | $\dfrac{a_c}{2}$ |
| 3. Copper volume in machine | $\alpha N_s a_c$ | Same |
| 4. Torque constant Nm/A per phase | $K_t$ | $2K_t$ |
| 5. Supply voltage/phase | $\dfrac{V_{s1}}{2}$ | $V_{s1}$ |
| 6. Power/phase | $\dfrac{V_{s1}}{2}I_p$ | $V_{s1}\dfrac{I_p}{2}$ |
| 7. Total power | $V_{s1}I_p$ | $V_{s1}[I_p]$ |
| 8. Phase current for equal power | $I_p$ | $I_p$ (unidirectional) $0.5I_p$ (bidirectional) |
| 9. Phase resistance in machine | $R_s$ | $4R_s$ |

For a bipolar drive, the phase currents are I/2 for the system illustrated by FIG. 3. The subscript p is deleted hereafter, for simplicity, from current I. The total stator resistive loss for any two conducting phase windings, for example phases A and B, with phase A current $I_a$ and phase B current $I_b$, is:

$$P_{cu} = (I_a^2 + I_b^2)4R_s = \left(\frac{I^2}{4} + \frac{I^2}{4}\right)4R_s = 2I^2R_s \tag{13}$$

And this resistive loss is the same as that for the system illustrated by FIG. 1. Thus, for bipolar operation, the systems of FIGS. 1 and 3 have the same resistive loss. However, the inverter losses are also an important consideration for improving the efficiency of a machine.

Consider the transistor conduction loss in the inverter. The switching losses are usually smaller compared to the conduction loss and, hence, are not considered.

Let $V_t$ designate the conduction voltage drop in each transistor of the system of FIG. 3, and let each phase transistor carry only half the rated current to produce the equivalent power produced by the system of FIG. 1. Then, the conduction loss $P_t$ for the two conducting phases at any given time in the system of FIG. 3 is:

$$P_t = V_t\left[\frac{I}{2} + \frac{I}{2}\right] = V_tI \tag{14}$$

In the system illustrated by FIG. 1, two transistors conduct to carry the same load current I at any given time, resulting in two transistor conduction losses $P_{tc}$ given by:

(15)    $P_{tc} = V_tI \times 2 = 2V_tI$

Therefore, the ratio of conduction loss between the systems of FIGS. 1 and 3 is:

$$\frac{P_t}{P_{tc}} = \frac{V_t I}{2V_t I} = \frac{1}{2} \quad (16)$$

Thus, the system of FIG. 3 reduces the conduction power loss by 50% with respect to that of the system of FIG. 1. This is on the order of 0.5 kW to 1 kW for an electric vehicle hybrid drive. And due to the lower conduction loss, the cooling requirement for the inverter is reduced, resulting in higher thermal robustness and reliability for the inverter.

The above description assumes that the phase voltage for the system of FIG. 3 is doubled with respect to that of the system of FIG. 1 and that each system provides the same base speed and base torque. An attractive parametric study is that in which the phase voltage at base speed for the system of FIG. 3 is something other than twice, such as less than twice, that of the system of FIG. 1.

Let the applied phase voltage for the system of FIG. 3 be expressed as:

$$v_{an} = k v_{dc} = k(2V_a) = (2k)V_a; \quad 0 < k \leq 1 \quad (17)$$

where $V_a$ is the applied phase voltage for the system of FIG. 1. At base speed, the applied phase voltage is equal to $V_{dc}/2$, where $V_{dc}$ is the dc supply voltage input to the inverter. Factor k varies the applied voltage from $2V_a$ to $2 kV_a$ or $kv_{dc}$ through the inverter. Accordingly, the system of FIG. 3 has to have a base voltage (i.e., at base speed) of $2 kV_a$ and, hence, the number of winding turns has to be multiplied by 2k as seen from emf equation (18).

$$N = (2k)N_s \quad (18)$$

Keeping the copper volume constant, for achieving a constant copper cost between the systems of FIGS. 1 and 3, results in a conductor cross section $a_c$ of:

$$a_c = \frac{a}{2k} \quad (19)$$

where a is the cross section of the conductor in the system of FIG. 1. The resistance of the machine of the system of FIG. 3 becomes:

$$R = (4k^2)R_s \quad (20)$$

where $R_s$ is the per phase resistance of the system of FIG. 1. The copper loss in the system of FIG. 1, in which a factor of I is introduced, is:

$$P_{cu} = (I_a^2 + I_b^2)R = (I_a^2 + I_b^2)(4k^2)R_s \quad (21)$$

The ratio of copper losses between the systems of FIGS. 1 and 3 is expressed as;

$$\frac{P_{cu(new)}}{P_{cu(conventional)}} = \frac{(I_a^2 + I_b^2)(4k^2)R_s}{(I_{ac}^2 + I_{bc}^2)R_s} \quad (22)$$

But $I_{ac} = I_{bc} = I$ (in system of FIG. 1) (23)

And $I_a + I_b = \frac{I}{k}$ (in system of FIG. 3) (24)

Letting $I_a = I_b$ in the above equation gives: (25)

$$I_a + I_b = 2I_a = \frac{I}{k} \quad (26)$$

which gives way to:

$$I_a = \frac{I}{2k} \quad (27)$$

The resistive loss in the system of FIG. 3 may be expressed as:

$$P_{cu(n)} = \left[\frac{I}{2k}\right]^2 2 * 4k^2 R_s = 2I^2 R_s \quad (28)$$

And that in the system of FIG. 1 may be expressed as:

$$P_{cu(c)} = 2I^2 R_s \quad (29)$$

Thus, the systems of FIGS. 1 and 3 have the same copper loss under the above-described circumstance.

The ratio of inverter conduction power losses is:

$$P_{tn} = V_t I / k \quad (30)$$

$$P_{tc} = 2V_t I$$

$$\frac{P_{tn}}{P_{tc}} = \frac{V_t I / k}{2V_t I} = \frac{1}{2k}$$

where $P_{tn}$ is the inverter conduction losses with the system of FIG. 3 and $P_{tc}$ is the inverter conduction losses with the system of FIG. 1. Some sample calculations are supplied in Table 3 to provide a feel for the implications of varying k, with respect to the number of turns per phase winding, resistance per phase, phase current, and ratio of conduction losses for the systems of FIGS. 1 and 3. $N_s$ is the number of turns per phase, $R_s$ is the resistance per phase, and I is the per phase current in the system of FIG. 1.

TABLE 3

| k | Number of turns per phase | Resistance per phase | $I_a$, Phase current | $P_{tn}/P_{tc}$ |
|---|---|---|---|---|
| 0.6 | 1.2 $N_s$ | 1.44 $R_s$ | 0.833 I | 0.835 |
| 0.707 | 1.414 $N_s$ | 2 $R_s$ | 0.707 I | 0.707 |
| 0.8 | 1.6 $N_s$ | 2.56 $R_s$ | 0.625 I | 0.625 |

Based on these numerical examples, the following inferences can be made:

1. As k increases, $P_{tn}$ decreases inversely.
2. Reserve voltage available to a machine phase is ($v_{dc} - kv_{dc}$) = $(1-k)v_{dc}$, and this increases with decreasing k.
3. The reserve voltage can be used to obtain a speed of operation that is greater than that of the base speed (at which machine delivers rated or base torque).

4. The new base speed for the system of FIG. 3 is 1/k in per unit. For example:

TABLE 4

| k | New base speed, p.u. |
|---|---|
| 0.6 | 1.667 |
| 0.707 | 1.414 |
| 0.8 | 1.25 |

Table 4 exemplifies that a very large extension of base speed, at which base torque is obtained, may be achieved by changing the value of k in a design. In Table 4, p.u. is the normalized speed, which is non dimensional and limited to low values, such as 1 or 2 or 3. For example, speed in p.u. is equal to the actual speed in revolutions per minute (rpm) divided by base, which is usually the rated speed. Suppose that the actual speed is 1000 rpm and base speed is 2000 rpm, then the speed in p.u. is equal to 1000/2000=0.5 p.u. This allows scaling to be done regardless of the variations in many variables such as in voltages, currents, torque, and power output by using base values for each of these variables to obtain manageable numbers of p.u. values.

5. Base speed extension also allows for higher range of flux-weakening operation, with the result that the system of FIG. 3 provides an excellent fit for electric vehicle or hybrid motor drive.

The system of FIG. 3 enables the operation of each phase independently of the other phases. For example, if the phases are given only unidirectional currents, then the total power and torque can be harvested from only one phase at any time, which has consequences on resistive losses, transistor conduction losses, and total losses. For example:

$$\text{Resistive losses} = 4R_s I^2 \quad (31)$$

$$\text{Transistor conduction loss} = V_t I \quad (32)$$

$$P_{ut} = \text{total losses using only unidirectional currents} = V_t I + 4R_s I^2 \quad (33)$$

Likewise:

$$P_{et} = \text{total drive losses of the system of FIG. 1} = 2V_t I - 2R_s I^2 \quad (34)$$

Equating losses for the systems of FIGS. 1 and 3 leads to:

$$2V_t I = 2R_s I^2 \quad (35)$$

which, in turn leads to the following condition:

$$I = \frac{V_t}{2R_s} \quad (36)$$

or $$V_t = 2R_s I \quad (37)$$

Two scenarios arise in regard to power losses:
(i) If $V_t > 2R_s I$, then the system of FIG. 3 provides lower power losses.
(ii) If $V_t < 2R_s I$, then the system of FIG. 1 provides lower losses.

For example, in electric vehicle drives, $V_t \geq 2R_s I$ and, thus, the system of FIG. 3 will be better than that of FIG. 1. Even if $V_t \leq 2R_s I$, the deficit in losses for the system of FIG. 3 can be wiped out by using the energy in $C_2$ to make a bidirectional drive, which will reduce the positive current to provide high efficiency operation. Further, the commutation of positive current is faster in the system of FIG. 3 because it charges $C_2$ directly from the phase current winding without involving another phase during its commutation. In addition, the system of FIG. 3 provides greater fault tolerance for a failed machine phase or inverter transistor.

It may be stated that mostly single-phase operation with a small amount of energy harvested with another phase excitation is an important mode of operation for the system of FIG. 3. That does not mean other modes of operation are excluded; other modes will play a role depending on the application of the motor drive system. The control principle for this is derived here where bipolar currents are used in machine phases but only small negative currents, as opposed to large positive currents, are employed. For illustration of this control strategy, consider the motor drive having a phase sequence of a,b,c. The conventional operation with bipolar currents is shown in Ref [R Krishnan, "Electric Motor Drives", Prentice Hall, 2001, pp. 523]. Consider a time instant when phase A current is positive and phase B current has to be negative. Let the phase currents be scaled up or down by a fact or of a and b for phases A and B, respectively, from their rated or base value of I and be denoted as:

A phase current $I_a = aI$, and
B phase current $I_b = bI$, where I is the rated current.
Then:

$$T_e = (a+b), \text{p.u.} \ I = 1 \text{ p.u.} \quad (38)$$

$$P_{cu} = (a^2 + b^2) 4R_s I^2 \quad (39)$$

Desired torque equals the rated torque, which may be defined as 1 p.u. (where p.u. is the per unit used as normalized non-dimensional unit and 1 p.u. indicates 100% or rated value of a variable, be it current, voltage, torque, power, etc.).

$$\therefore a + b = 1; a = 1 - b; b = 1 - a \quad (40)$$

$$P_{cn} = [a^2 + (1-a)^2] 4R_s I^2 \quad (41)$$
$$= [2a^2 - 2a + 1] 4R_s I^2$$

Equate this to conventional operation $P_{cu}$ loss as $$[2a^2 - 2a + 1] 4R_s I^2 = 2R_s I^2 \quad (42)$$

$$2a^2 - 2a + \frac{1}{2} = 0$$

$$\therefore a = \frac{1}{2}; b = \frac{1}{2}$$

Include device conduction loss; then the equations become for the system of FIG. 3:

$$a+b=1, P_{in} = (a^2+b^2) 4R_s I^2 + (a+b) v_t I \quad (43)$$

Where $v_t$ is the transistor conduction voltage drop in the inverter. And for the system of FIG. 1, the total loss is:

$$P_{tc} = 2R_s I^2 + 2v_t I \quad (44)$$

If a and b are fractions and do not add up to 1, different results are possible. Both cases will be examined (i.e., a+b=1, and a+b<1) in the following. Consider:

$$P_{in} = \frac{(a^2 + b^2) 4R_s I^2 + (a+b) v_t I}{2R_s I^2 + 2v_t I}, \begin{cases} I_a = aI \\ I_b = bI \end{cases} \quad (45)$$

-continued $$= \frac{(a^2+b^2)4R_sI + (a+b)v_t}{2R_sI + 2v_t}$$

$$= \frac{(a^2+b^2)4\frac{R_sI}{v_t} + (a+b)}{2\frac{R_sI}{v_t} + 2}$$

The ratio of the total loss $P_r$ between the systems of FIGS. 3 and 1 is given by:

$$P_r = \frac{P_{tn}}{P_{tc}} = \frac{4R_{sn}(a^2+b^2) + (a+b)}{2(R_{sn}+1)} \quad (46)$$

where the normalized stator resistance $R_{sn}$ is defined as:

$$R_{sn} = \frac{R_sI}{v_t}, \; p.u. \quad (47)$$

Case (i): a+b=1 and $P_r$=1

$$P_r = 1 = \frac{4R_{sn}(a^2 + \{1-a\}^2) + 1}{2(R_{sn}+1)} \quad (48)$$

$$2R_{sn} + 2 = 4R_{sn}\lfloor 2a^2 - 2a + 1 \rfloor + 1 \quad (49)$$
$$= 8R_{sn}a^2 - 8R_{sn}a + 4R_{sn} + 1$$

leading to:

$$(8R_{sn})a^2 - (8R_{sn})a + 2R_{sn} - 1 = 0 \quad (50)$$

Solving for a:

$$a = \frac{8R_{sn} \pm \sqrt{64R_{sn}^2 - 32R_{sn}(2R_{sn}-1)}}{16R_{sn}} \quad (51)$$

$$= 0.5 \pm 0.3535\sqrt{\frac{1}{R_{sn}}}$$

Figure 7:
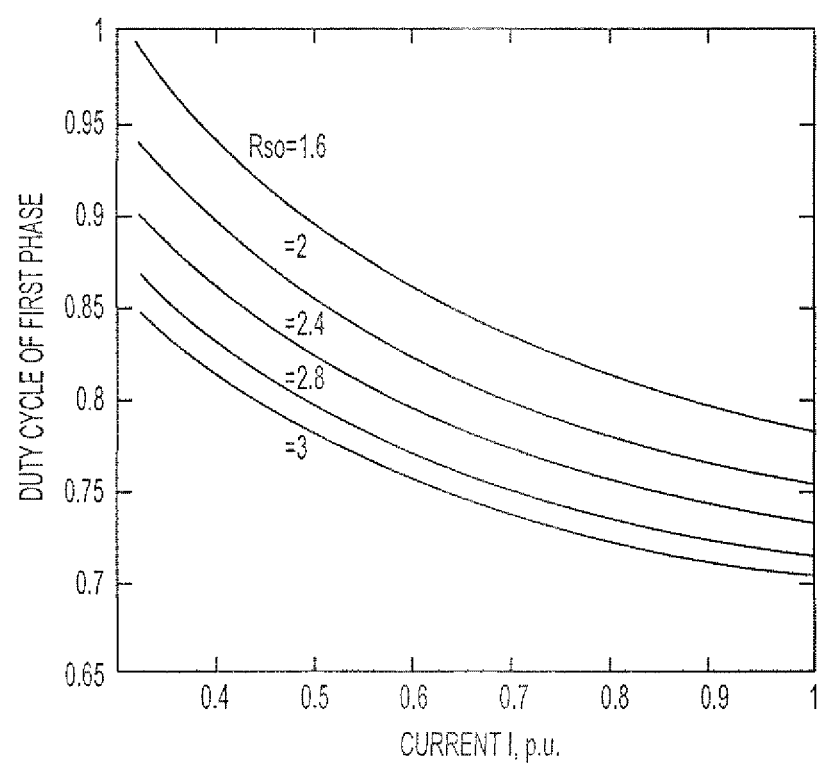
FIG. 7 illustrates the duty cycle of a positive-current conducting phase vs. current magnitude as a function of normalized stator phase resistance.

Phase current for the positive conducting phase, identified as the first phase in FIG. 4, versus I for various $R_{sn}$, ranging from 0.5 to 3 p.u., is shown in FIG. 7. FIG. 7 illustrates the current in positive phase, normalized units. From the value of a, the value of b can be extracted as b=1−a, and this is the normalized current in negative phase. The latter indicates the current to be supplied by $C_2$ (i.e., auxiliary capacitor). FIG. 6 shows the operating points with the constraints that the sum of two phase currents equal one p.u. and the loss in each of systems 1 and 3 is the same. As may be determined from FIG. 7, for $R_{sn}$=2.1 or higher values and for a<0.7, the losses in the system of FIG. 3 are attractive compared to those of the system of FIG. 1.

Case(ii): a+b<1 means less than rated current being supplied, say for partial loads.
In this case:

$$P_r = \frac{4R_{sn}(a^2+b^2) + (a+b)}{2\{R_{sn}(a+b)^2 + (a+b)\}} \quad (52)$$

If a+b=m, then b=(m−a) \quad (53)

$$\therefore P_r = \frac{4R_{sn}\{a^2 + a^2 - 2am + m^2\} + m}{2[R_{sn}m^2 + m]} \quad (54)$$

Given the value of m, the value of a can be found and then the value of b for a given $P_r$ (assume it is equal to 1, i.e., $P_r$=1). Note that the torque is assumed to be equal for both systems of FIGS. 1 and 3.

Case(iii): a=b, but a+b≤1.

$$P_r = \frac{4R_{sn}\lfloor 2a^2 \rfloor + 2a}{2[4a^2 R_{sn} + 2a]} = \frac{4R_{sn}a^2 + a}{4a^2 R_{sn} + 2a} = \frac{4aR_{sn} + 1}{2[2aR_{sn} + 1]} \quad (55)$$

Under the constraints described above, the system of FIG. 3 has lower loss than that of the system of FIG. 1, as the numerator of the above equation is smaller than the denominator. Such is advantageous for a partial load condition, which is what most drive applications encounter in practice.

Consider the system of FIG. 1 and assume that one of the machine phase windings has an open-circuit fault, in such a case, current in the other two phase windings cannot be controlled as required with electrical 120° in both their positive and negative half cycles. Contrast this with the system of FIG. 3 in which only the phase winding having an open-circuit fault is deprived of current. The remaining phases will get their respective currents, as shown in FIG. 4, without any change as compared to a pre-fault condition. Similar reasoning can be applied to short-circuit fault cases in the machines, with the same advantage being maintained in the system of FIG. 3. Similar reasoning is extendable to inverter transistor failures and the availability of currents to phases that are unaffected by the fault.

Although the currents in the above discussion have been considered as ideal currents, ideal currents are not possible to realize, but may be closely realized by resorting to pulse width modulation (PWM) control of the inverter transistors. The control of transistor inverters to shape currents is well known in text books, one of which is R. Krishnan, "Electric Motor Drives", Prentice Hall, 2001. Those knowledgeable in the art are familiar with PWM control of a transistor inverter.

Variations of the invention exist, such as provisioning the dc supply voltage from a battery or connecting an ac-rectified dc supply across $C_2$ instead of $C_1$ within the system of FIG. 3. The change in the supply input points supports negative half-cycle based unidirectional current control, without affecting bidirectional current control. The change in the supply input points does not affect the torque or power output.

Consider a case in which the top capacitor $C_1$ in the system of FIG. 3 is connected to a dc supply voltage, obtained from a rectified ac supply, and a battery is connected across $C_2$ with the illustrated polarity. If the ac supply fails, the dc input voltage to the capacitor $C_1$ is lost, but $C_1$ can be charged from the battery across $C_2$ by using the bottom transistors, machine phase windings, and respective top diodes of the inverter. The battery can be kept charged when the ac supply is available, which is then rectified and fed to charge $C_1$. Then, the charge stored by $C_1$ can be transferred to $C_2$ using the machine phase windings, top transistors, and bottom diodes of the inverter. Therefore, this system provides an uninterrupted power supply to run the PMBDC motor drive when one of the power sources, either from a rectified ac supply or from a battery is absent. This arrangement of having the battery across $C_2$ allows the battery to be charged through the controlled flow of current in the machine windings. Therefore, battery charging is accomplished without additional components, such as a transistor, an inductor, and a circuit breaker that usually are required in a separate charger such as buck or boost charger.

Figure 8:
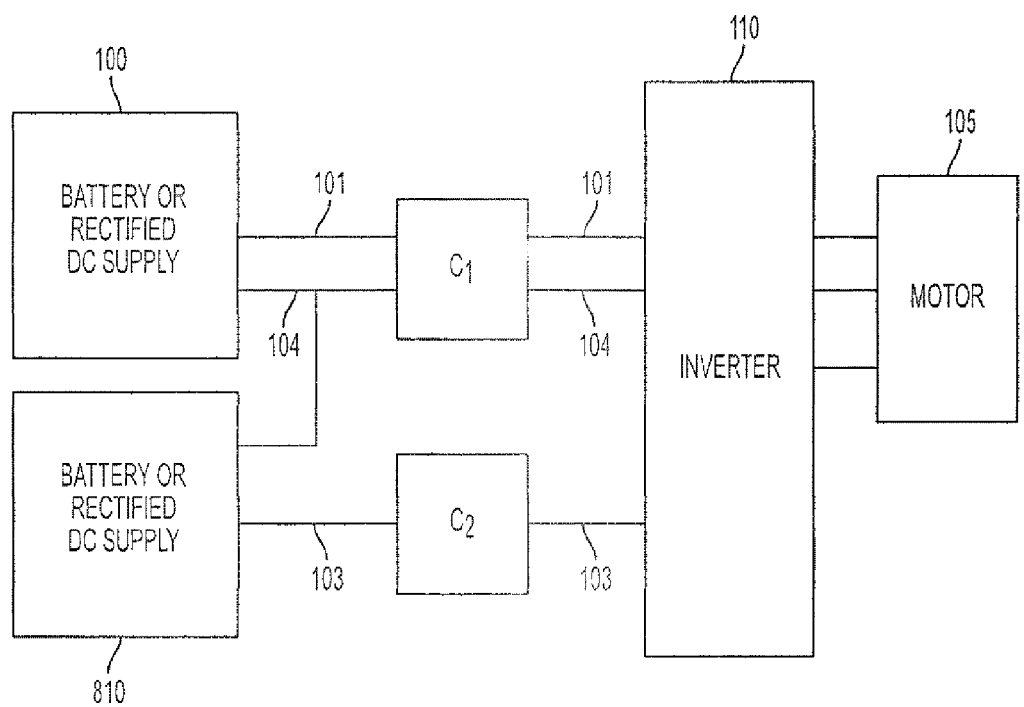
FIG. 8 illustrates an uninterruptible-supply power converter.

FIG. 8 illustrates such an uninterruptable power supply for a power converter. FIG. 8 illustrates the same system as FIG. 3, with the exception that a battery or dc supply is connected in parallel with capacitor $C_2$. With this arrangement, the uninterruptable operation of the system illustrated in FIG. 3 may be achieved as described in the preceding paragraph.

By contrast to the system of FIG. 1, the system of FIG. 3 provides:
1. higher reliability and fault tolerance;
2. higher speed of operation;
3. lower conduction losses in an inverter;
4. higher efficiency in the machine; and
5. higher efficiency operation.

Moreover, a split phase dc is created without an additional buck or boost or buck-boost converter at the front-end. And four quadrant operation with a higher torque-speed envelope for transient operation and steady-state operation is achieved. Other benefits of the system of FIG. 3 include:
1. full dc input voltage to the phase winding;
2. unidirectional current operation;
3. four quadrant operation;
4. bidirectional or bipolar current operation;
5. flexible operation to vary the magnitude of currents and voltages across the machine windings using pulse width modulation or other known means;
6. minimization of total losses that include stator resistive losses and transistor conduction losses;
7. extension of base speed by as much as two times with full rated or base torque;
8. extension of base speed can be varied from 1 to 2 at least;
9. fault tolerance is high in both the machine as well as in the inverter;
10. uninterrupted operation of a PMBDC motor drive when a power source fails; and
11. controlled current charging of a battery from a rectified ac supply without additional components.

The foregoing has been a detailed description of possible embodiments of the invention. Other embodiments of the invention will be apparent to those skilled in the art from consideration of the specification and practice of the invention. Accordingly, it is intended that this specification and its disclosed embodiments be considered as exemplary only, with a true scope and spirit of the invention being indicated by the following claims.

What is claimed is:

1. A motor drive system comprising:
a first capacitive element that stores energy to provide a first direct current (dc) voltage supply;
a second capacitive element that stores energy to provide a second dc voltage supply;
a first electrically conductive switch for electrically connecting in series with a winding of a single motor phase and the first capacitive element to form a first series circuit when the first switch conducts current;
a second electrically conductive switch for electrically connecting in series with the motor phase winding and the second capacitive element to form a second series circuit when the second switch conducts current;
a dc supply electrically connected in parallel with one of the first and second capacitive elements, such that substantially an entire voltage of the dc supply is applied across the one of the first and second capacitive elements; and
a battery electrically connected in parallel with the one of the first and second capacitive elements that is not electrically connected in parallel with the dc supply, such that substantially an entire voltage of the battery is applied across the one of the first and second capacitive elements that is not electrically connected in parallel with the dc supply, wherein:
the entire voltage of the first capacitive element is applied across the motor phase winding, less the voltage drop across the first switch and the voltage drop resulting from parasitic resistance in the first series circuit, when: (1) the second switch does not conduct current and (2) the second capacitive element is neither being charged nor discharged, and
the entire voltage of the second capacitive element is applied across the motor phase winding, less the voltage drop across the second switch and the voltage drop resulting from parasitic resistance in the second series circuit, when: (1) the first switch does not conduct current and (2) the first capacitive element is neither being charged nor discharged.

2. The motor drive system of claim 1, wherein:
the first series circuit passes current in a first polarity through the motor phase winding when the first switch conducts current, the second switch does not conduct current, and the second capacitive element is neither being charged nor discharged, and
the second series circuit passes current in a second polarity, opposite to the first polarity, through the motor phase winding when the second switch conducts current, the first switch does not conduct current, and the first capacitive element is neither being charged nor discharged.

3. The motor drive system of claim 1, further comprising:
an Nth electrically conductive switch, N being an integer greater than 1, for electrically connecting in series with an Nth motor phase winding and the first capacitive element to form an Nth series circuit when the Nth switch conducts current; and
an Nth+1 electrically conductive switch for electrically connecting in series with the Nth motor phase winding and the second capacitive element to form an Nth+1 series circuit when the Nth+1 switch conducts current, wherein:
the entire voltage of the first capacitive element is applied across the Nth motor phase winding, less the voltage drop across the Nth switch and the voltage drop resulting from parasitic resistance in the Nth series circuit, when: (1) the Nth+1 switch does not conduct current and (2) the second capacitive element is neither being charged nor discharged, and
the entire voltage of the second capacitive element is applied across the Nth motor phase winding, less the voltage drop across the Nth+1 switch and the voltage drop resulting from parasitic resistance in the Nth+1 series circuit, when: (1) the Nth switch does not conduct current and (2) the first capacitive element is neither being charged nor discharged.

4. The motor drive system of claim 3, wherein:
the Nth series circuit passes current in a first polarity through the Nth motor phase winding when the Nth switch conducts current, the Nth+1 switch does not conduct current, and the second capacitive element is neither being charged nor discharged, and
the Nth+1 series circuit passes current in a second polarity, opposite to the first polarity, through the Nth motor phase winding when the Nth+1 switch conducts current, the Nth switch does not conduct current, and the first capacitive element is neither being charged nor discharged.

5. The motor drive system of claim 3, wherein an H-bridge inverter comprises original first, second, Nth, and Nth+1 switches.

6. The motor drive system of claim 1, further comprising:
a first unidirectional current element that passes current in only one direction and is electrically connected in parallel with the first switch;
a second unidirectional current element that passes current in only one direction and is electrically connected in parallel with the second switch, wherein:
the first or second unidirectional current element discharges energy stored by the motor phase winding to the first or second capacitive element, respectively, when both the first and second switches are not conducting current.

7. A motor drive system comprising:
a phase winding of a motor that applies electromotive force to a rotor of the motor;
a first capacitive element that stores energy to provide a first direct current (dc) voltage supply;
a second capacitive element that stores energy to provide a second dc voltage supply;
a first electrically conductive switch for electrically connecting in series with the motor phase winding and the first capacitive element to form a first series circuit when the first switch conducts current;
a second electrically conductive switch for electrically connecting in series with the motor phase winding and the second capacitive element to form a second series circuit when the second switch conducts current;
a dc supply electrically connected in parallel with one of the first and second capacitive elements, such that substantially an entire voltage of the dc supply is applied across the one of the first and second capacitive elements; and
a battery electrically connected in parallel with the one of the first and second capacitive elements that is not electrically connected in parallel with the dc supply, such that substantially an entire voltage of the battery is applied across the one of the first and second capacitive elements that is not electrically connected in parallel with the dc supply, wherein:
the entire voltage of the first capacitive element is applied across the motor phase winding, less the voltage drop across the first switch and the voltage drop resulting from parasitic resistance in the first series circuit, when: (1) the second switch does not conduct current and (2) the second capacitive element is neither being charged nor discharged, and
the entire voltage of the second capacitive element is applied across the motor phase winding, less the voltage drop across the second switch and the voltage drop resulting from parasitic resistance in the second series circuit, when: (1) the first switch does not conduct current and (2) the first capacitive element is neither being charged nor discharged.

8. The motor drive system of claim 7, wherein:
the first series circuit passes current in a first polarity through the motor phase winding when the first switch conducts current, the second switch does not conduct current, and the second capacitive element is neither being charged nor discharged, and
the second series circuit passes current in a second polarity, opposite to the first polarity, through the motor phase winding when the second switch conducts current, the first switch does not conduct current, and the first capacitive element is neither being charged nor discharged.

9. A motor drive system comprising:
a first capacitive element that stores energy to provide a first direct current (dc) voltage supply;
a second capacitive element that stores energy to provide a second dc voltage supply;
first, second, third, and fourth electrically conductive switches each comprising an input current terminal and an output current terminal;
a dc supply electrically connected in parallel with one of the first and second capacitive elements, such that substantially an entire voltage of the dc supply is applied across the one of the first and second capacitive elements; and
a battery electrically connected in parallel with the one of the first and second capacitive elements that is not electrically connected in parallel with the dc supply, such that substantially an entire voltage of the battery is applied across the one of the first and second capacitive elements that is not electrically connected in parallel with the dc supply, wherein:
a first terminal of the first capacitive element is electrically connected directly to the input current terminals of the first and second switches,
a second terminal of the first capacitive element is electrically connected directly to a first terminal of the second capacitive element,
a second terminal of the second capacitive element is electrically connected directly to the output current terminals of the third and fourth switches,
the output current terminal of the first switch is electrically connected directly to the input current terminal of the third switch,
the output current terminal of the second switch is electrically connected directly to the input current terminal of the fourth switch,
a first terminal of a winding of a first motor phase is electrically connected directly to the second terminal of the first capacitive element and the first terminal of the second capacitive element,
a second terminal of the first motor phase winding is electrically connected directly to the output current terminal of the first switch and the input current terminal of the third switch,
a first terminal of a winding of a second motor phase is electrically connected directly to the second terminal of the first capacitive element and the first terminal of the second capacitive element,
a second terminal of the second motor phase winding is electrically connected directly to the output current terminal of the second switch and the input current terminal of the fourth switch.

10. The motor drive system of claim 9, further comprising:
fifth and sixth electrically conductive switches each comprising an input current terminal and an output current terminal, wherein:
the first terminal of the first capacitive element is electrically connected directly to the input current terminal of the fifth switch,
the second terminal of the second capacitive element is electrically connected directly to the output current terminal of the sixth switch,
the output current terminal of the fifth switch is electrically connected directly to the input current terminal of the sixth switch,
a first terminal of a winding of a third motor phase is electrically connected directly to the second terminal of the first capacitive element and the first terminal of the second capacitive element,
a second terminal of the third motor phase winding is electrically connected directly to the output current terminal of the fifth switch and the input current terminal of the sixth switch.

11. A motor drive method comprising:
charging a first capacitive element using a direct current (dc) power supply electrically coupled in parallel with the first capacitive element; wherein substantially an entire voltage of the dc power supply is applied across the first capacitive element;
charging a second capacitive element using a battery electrically coupled in parallel with the second capacitive element; wherein the second capacitive element is not electrically connected in parallel with the dc supply and substantially an entire voltage of the battery is applied across the second capacitive element;
discharging energy stored by the first capacitive element into a single electrical phase of a motor, via a first electrically conductive switch, such that the entire voltage across the first capacitive element is applied across the motor phase winding, less the voltage drop across the first switch and the voltage drop resulting from parasitic resistance in a first series circuit comprising the first capacitive element, the first switch, and the motor phase winding; and
discharging energy stored by the motor phase winding into a second capacitive element, via a second electrically conductive switch, such that the entire voltage across the motor phase winding is applied across the second capacitive element, less the voltage drop across the second switch and the voltage drop resulting from parasitic resistance in a second series circuit comprising the second capacitive element, the second switch, and the motor phase winding.

* * * * *